United States Patent [19]

Logel et al.

[11] Patent Number: 4,535,226
[45] Date of Patent: Aug. 13, 1985

[54] DOMESTIC ELECTRIC COOKING OVEN

[75] Inventors: Bernard Logel, Gundershoffen; Robert Koehl, Bischholtz, both of France

[73] Assignee: De Dietrich & Cie, Niederbronn les Bains, France

[21] Appl. No.: 691,366

[22] Filed: Jan. 14, 1985

Related U.S. Application Data

[63] Continuation of Ser. No. 454,415, Dec. 29, 1982, abandoned.

[30] Foreign Application Priority Data

Jan. 6, 1982 [GB] United Kingdom ............... 8200089

[51] Int. Cl.³ .................. H05B 1/02; F24C 15/32; A21B 1/22
[52] U.S. Cl. .................. 219/400; 126/21 A; 219/396; 219/398; 219/483
[58] Field of Search ............... 219/400, 391, 395, 396, 219/397, 398, 483, 486; 126/21 A, 21 R

[56] References Cited

U.S. PATENT DOCUMENTS

| | | | |
|---|---|---|---|
| 2,221,595 | 11/1940 | Lockwood | 219/400 |
| 2,259,315 | 10/1941 | Lockwood | 219/398 |
| 2,611,790 | 9/1952 | Koch | 219/400 |
| 2,778,914 | 1/1957 | Vallorani | 219/397 |
| 2,828,404 | 3/1958 | Long | 219/398 |
| 3,678,245 | 7/1972 | Ackermann | 219/400 |

FOREIGN PATENT DOCUMENTS

| | | | |
|---|---|---|---|
| 2657929 | 6/1978 | Fed. Rep. of Germany | |
| 2658686 | 6/1978 | Fed. Rep. of Germany | |
| 2166227 | 12/1978 | Fed. Rep. of Germany | 219/400 |
| 2757059 | 6/1979 | Fed. Rep. of Germany | |
| 2347623 | 4/1977 | France | 219/400 |
| 55-63329 | 5/1980 | Japan | 219/400 |

Primary Examiner—Roy N. Envall, Jr.
Assistant Examiner—Teresa J. Walberg
Attorney, Agent, or Firm—Burns, Doane, Swecker & Mathis

[57] ABSTRACT

The oven includes a muffle 1 in which are mounted at least one upper heating element 11b, 11b, at least one lower heating element 14, an air circulating fan 4 provided in the rear wall 3 of the muffle 1, a heating element 6 placed in the current of air produced by the fan 4, a device 8 for ducting the air in such manner that the air blown by the fan is directed in roughly horizontal streams in the chamber defined by the muffle 1, and an electric switching device. The latter selectively connects the heating elements and the fan to a power supply. This switching device has a given position in which it is capable of connecting the heating element 6 associated with the fan in series with the upper heating element or elements 11a, 11b while connecting the fan 4 and the lower heating element 14 to the supply.

4 Claims, 5 Drawing Figures

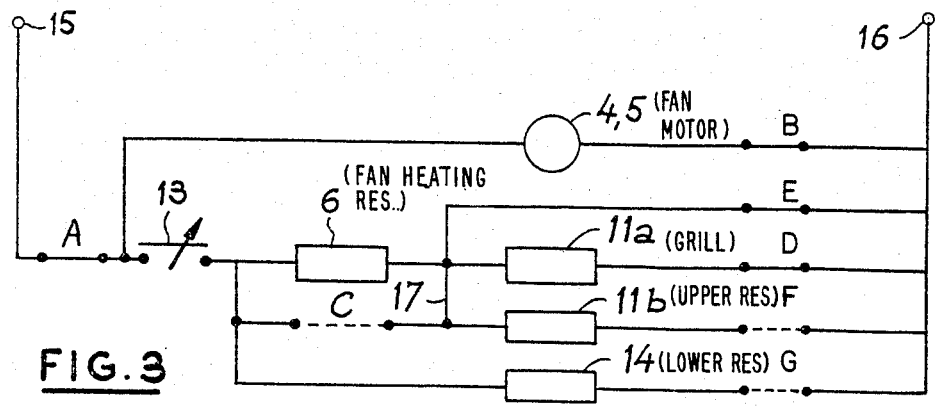
FIG.3
FIG.4
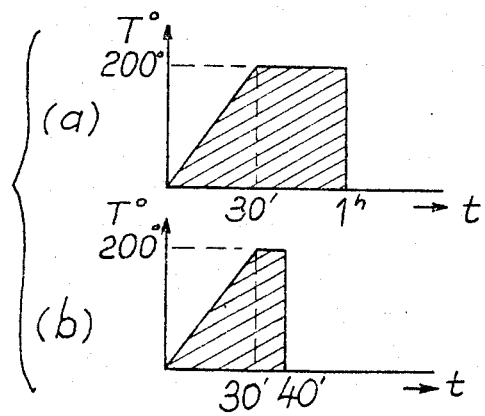
FIG.5

DOMESTIC ELECTRIC COOKING OVEN

This application is a continuation of application Ser. No. 454,415, filed Dec. 29, 1982, now abandoned.

DESCRIPTION

The present invention relates to domestic electric cooking ovens of the type comprising a muffle in which are mounted at least one upper heating element, at least one lower heating element, an air circulating fan provided in the rear wall of the muffle, a heating element placed in the current of air circulated by the fan, an air ducting means adapted to direct the air blown by the fan in substantially horizontal streams in the chamber of the muffle, and an electric switching device for selectively connecting said heating elements and said fan to an electric current supply.

Such ovens have already been put on the market. Their electric switching devices are adapted to enable the user to place the oven in a first configuration termed "conventional configuration", in which the upper and lower elements are exclusively connected to the supply, and also in a second configuration in which only the heating element associated with the fan and the fan itself are operative. This second configuration is commonly known as convection.

In such an oven, it is therefore possible to group the advantages of both types of cooking, i.e. in the conventional configuration, good results are obtained with meat and rather less good results are obtained with pastries (it being practically impossible to cook on a plurality of levels at the same time in the oven), whereas in the convection heat configuration, it is rather more the dry pastries which are the most successful with the considerable advantage of the possibility of cooking simultaneously on a plurality of levels.

However, this oven has certain drawbacks which are the following:

(1) Certain pastries, in particular fruit tarts termed moist tarts with puff paste or short paste ("pâste brisée") are insufficiently baked from below.

It is then necessary to employ certain artifices to obtain a good result and this requires a certain know-how.

(2) For cooking at a single level, only one or the other of the configurations can be employed and this results in a choice of a relatively long cooking time and consequently a high consumption of energy.

(3) The horizontal distribution of the energy is not as uniform as might be desired in the convection heat configuration, this distribution being moderately acceptable in the conventional configuration.

An object of the invention is to provide a domestic cooking oven of the type defined hereinbefore which is devoid of the aforementioned drawbacks.

According to the invention, the feature of this oven is that said switching device has a position in which it is capable of connecting said fan heating element in series with the upper heating element or elements while connecting the fan and the lower heating element to the supply.

Owing to these features, the oven can be placed in a so-called mixed configuration in which the lower heating element operates at full power while the heating elements of the upper and fan consume only a relatively low power, the heat generated thereby spreading throughout the chamber of the oven. Consequently, in the process of cooking on a single level, the dishes receive a large amount of heat from below by radiation and convection (for example for the baking of the bottom of a moist tart), whereas the sum of the heat furnished by the other resistances results in a baking or cooking time which is shorter than would be necessary in the other configurations of the oven. Consequently, there is not only an improved culinary result, but also a saving in the consumption of energy which might be as much as 8% in respect of moist pastry as compared with the convection heat configuration.

The invention is described hereinafter in more detail with reference to the drawings which show only one embodiment and in which:

FIG. 3 shows also in a very simplified manner an electric diagram of the oven;

FIG. 4 is a diagram of the operation of the switching device employed in the oven according to the invention, and FIG. 5 shows, by graphs of the temperature as a function of time, the consumptions of energy when the oven is in the convection heat configuration and in the mixed configuration, respectively.

Figure 1:
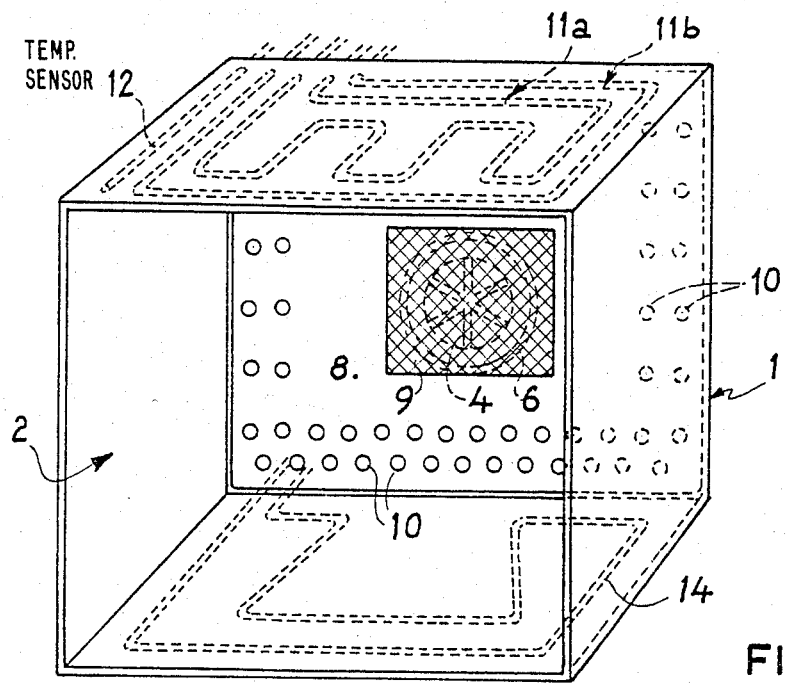
FIG. 1 is a very simplified perspective view of an oven constructed in accordance with the features of the invention.
Figure 2:
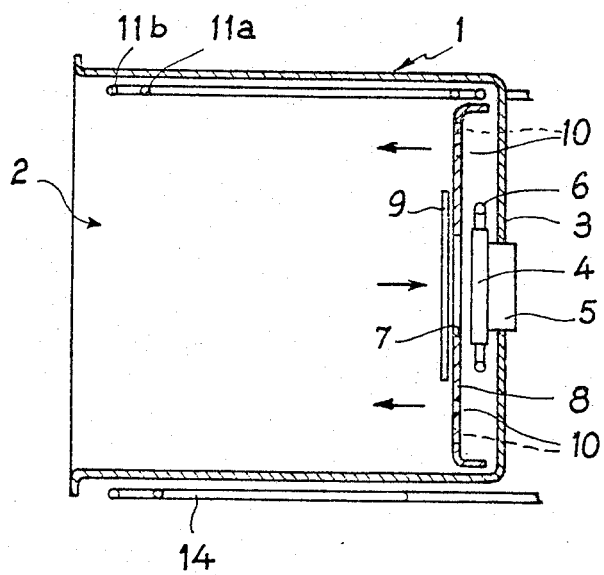
FIG. 2 is a vertical sectional view of this oven.

With reference first of all to FIGS. 1 and 2, there is shown diagrammatically an oven muffle 1 defining a cooking chamber 2 which is of course closed by a door (not shown) during the cooking.

In the rear wall 3 of the muffle 1, there is mounted a fan 4 driven by an electric motor 5, the blades of the fan being surrounded by a fan resistance 6, for example formed by two coaxial coils. The intake side of the fan is placed in opposed relation to the central opening 7 of an air ducting plate 8 in front of which latter a filter 9 is mounted. The ducting plate 8 includes outlet orifices 10 adjacent to its periphery.

Upper heating elements 11a and 11b (also termed grill resistance and upper resistance) are mounted in the top of the muffle parallel to its upper wall. A temperature sensor 12 controlling a thermostat contact 13 (see FIG. 3) is disposed on one side of the upper resistance 11b.

A lower heating element 14 or lower resistance is disposed below the lower wall of the muffle 1.

The manner of interconnecting the electric elements just described will be clear from the simplified diagram of FIG. 3 in which it can be seen that these elements are associated with switching means comprising seven switch contacts A to G, the selective opening or closing of which can be achieved by means of a single control knob (not shown) located on the control panel of the cooking apparatus. All of the circuitry is adapted to be connected through its terminals 15 and 16 to a source of current (for example the 220 V mains).

The contact A is connected to the terminal 15 and is connected in series with the rest of the circuitry for connecting to the supply or cutting off this supply.

The motor 5 of the fan 4 is connected in series with the contact B between the contact A and the terminal 16. The thermostat contact 13 responsive to the sensor 12 is connected between the contact A and the circuit which comprises the heating elements of the oven. Thus, the turbine heating element 6 is connected between the thermostat contact 13 and a junction point 17 to which are connected the grill and upper elements 11a and 11b connected in series with the respective contacts D and F, the whole being connected in parallel to the contact E of the switching means. The lower resistance 14 is connected in series with the contact G between the contact 13 and the terminal 16.

FIG. 4 shows a switching diagram achieved by means of the contacts A to G of the switching means which are shown in the left column of the table. Each of the other columns indicates an operational state of the oven, i.e. a given position of the contact which constitutes the switching means, a shaded square representing the closure of the corresponding contact. These states are as follows:

(a) Opening of the circuit (oven inoperative).
(b) De-freezing (the fan rotates without a heating of the oven).
(c) Convection heat (fan+fan resistance).
(d) Mixed cooking (fan, fan resistance, lower resistance and the two elements placed in the top of the muffle).
(e) Fan-grill (fan and resistances placed in the top).
(f) Catalytic cleaning.
(g) Grill (large area).
(h) Grill (small area).
(i) Conventional (lower element and two crown elements).
(j) Pyrolysis.

The diagram of FIG. 4 shows that the furnace according to the invention may be placed, by means of a simple switching with a single knob, not only in the conventional configurations such as "convection heat" and "conventional" configurations (positions c and i), but also in a so-called "mixed" configuration in the course of which the oven is heated by the lower resistance 14 supplying a great amount of heat from the base of the muffle and by the connection in series of the resistance 6 associated with the fan on one hand, and the connection in parallel of the upper resistances 11a and 11b on the other hand, whose heat is evenly distribution in the muffle owing to the rotation of the fan 4. This is the position d of FIG. 4.

The oven according to the invention therefore combines all the advantages of the two aforementioned conventional cooking or baking modes and those resulting from the third "mixed" configuration. These special advantages are in particular an improved horizontal distribution of the heat in the oven, the supply of heat being distributed in an improved manner in particular by the connection in series of the lower resistance and the connection in parallel of the upper resistances in series with the resistance associated with the fan.

These advantages are above all appreciable when baking pastries with a moist bottom, such as most of the fruit tarts and dishes of the "quiche lorraine" type. Indeed, the bottom of these dishes is rapidly baked by the heat furnished by the lower resistance which carries current throughout the operation of the oven and is regulated by the thermostat.

FIG. 5 shows by way of comparison two diagrams of the temperature as a function of time corresponding to the baking of a pastry of the aforementioned type.

Diagram (a) shows the consumption of energy for the "convection heat" configuration (position c) and the diagram (b) shows this consumption in the mixed configuration (position d).

In the course of the corresponding trial, it was found that there was obtained in the second case in all a saving in energy of the order of 8% as compared with the first case, notwithstanding the fact that a higher power must be employed. However, the cooking or baking time is reduced by 20 minutes for a cooking time of 1 hour in the convection heat configuration. This reduced time is a considerable advantage for the user.

Having now described our invention what we claim as new and desire to secure by Letters Patent is:

1. A domestic electric cooking oven comprising a muffle which defines a chamber and in which are mounted at least one upper heating element, at least one lower heating element, an air circulating fan provided in a rear wall of the muffle for creating a current of air, a heating element associated with the fan and placed in the current of air from the fan, air conditioning means adapted to orient the air blown by the fan in accordance with substantially horizontal streams in the chamber defined by the muffle, and an electric switching device for connection to an electric power supply and for selectively connecting said heating elements and said fan to said supply, wherein said switching device comprises a given position in which given position it is capable of connecting said heating element associated with the fan in series with the upper heating element while connecting each of the fan and said lower heating element to said supply in parallel with said serially connected fan heating element and upper heating element.

2. An oven according to claim 1, comprising two upper heating elements, said upper heating elements being connected in parallel with each other and being connected together in series with the heating element associated with the fan in said given position of the switching means.

3. An oven according to claim 1, wherein the switching device has a position for connecting the lower heating element and the upper heating element in parallel for cleaning the muffle by the effect of pyrolysis.

4. An oven according to claim 2, wherein the switching device has a position for connecting the lower heating element and the upper heating element in parallel for cleaning the muffle by the effect of pyrolysis.

* * * * *